US008693312B2

(12) United States Patent
Zhu et al.

(10) Patent No.: US 8,693,312 B2
(45) Date of Patent: Apr. 8, 2014

(54) METHOD, SYSTEM AND DEVICE FOR PROCESSING REGISTRATION EXCEPTION IN USER REGISTRATION PROCEDURE

(75) Inventors: Fenqin Zhu, Shenzhen (CN); Yajuan Wu, Shenzhen (CN); Yingxin Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1511 days.

(21) Appl. No.: 11/780,791

(22) Filed: Jul. 20, 2007

(65) Prior Publication Data

US 2007/0287454 A1 Dec. 13, 2007

Related U.S. Application Data

(63) Continuation of application No. PCT/CN2006/001400, filed on Jun. 20, 2006.

(30) Foreign Application Priority Data

Jun. 20, 2005 (CN) .......................... 2005 1 0076889

(51) Int. Cl.
*H04L 12/26* (2006.01)
(52) U.S. Cl.
USPC ......... 370/218; 370/400; 455/435.1; 709/227
(58) Field of Classification Search
None
See application file for complete search history.

(56) References Cited

U.S. PATENT DOCUMENTS

| 2004/0230697 | A1 | 11/2004 | Kiss et al. |
| 2004/0234060 | A1 | 11/2004 | Tammi et al. |
| 2004/0243711 | A1* | 12/2004 | Rajaniemi ...................... 709/227 |
| 2005/0009520 | A1* | 1/2005 | Herrero et al. ............. 455/435.1 |

FOREIGN PATENT DOCUMENTS

| CN | 1642346 A | 7/2005 |
| WO | WO 2004/089023 A1 | 10/2004 |
| WO | WO 2004/102900 A1 | 11/2004 |
| WO | WO 2005/064978 A1 | 7/2005 |
| WO | WO 2005/039108 | * 4/2010 ............. H04L 12/26 |

OTHER PUBLICATIONS

ETSI Standards, "Universal Mobile Telecommunications System (UMTS); Security Aspects of Early IMS (3GPP TR 33.978 Version 6.0.1 Release 6)," 3-SA3(V601) (Apr. 2005).

(Continued)

*Primary Examiner* — Brian Roberts
(74) *Attorney, Agent, or Firm* — Leydig, Voit & Mayer, Ltd.

(57) ABSTRACT

A method for processing a registration exception in a user registration procedure is provided to solve the problem that network devices are unable to determine subsequent handling procedures when a registration exception occurs in a registration, where it is impossible to distinguish the initial registration and the re-registration according to whether the registration request is a protected register. According to the solution disclosed by the embodiments of the present invention, after the I-CSCF forwards the registration request to the S-CSCF and determines that a registration exception occurs, the I-CSCF returns a registration failure message to the terminal initiating the registration request or reselects a new S-CSCF, according to instruction information, indicating whether the registration request is an initial registration or a re-registration, carried in the registration request or according to S-CSCF-associated information carried in a response from the HSS.

9 Claims, 3 Drawing Sheets

(56) References Cited

OTHER PUBLICATIONS

ETSI Standards, "Digital Cellular Telecommunications System (Phase 2+); Universal Mobile Telecommunications System (UMTS); IP Multimedia (IM) Subsystem Cx and Dx Interfaces; Signalling Flows and Message Contents (3GPP TS 29.228 Version 6.6.1 Release 6)," 3-CN4(V661) (Apr. 2005).

Huawei, "S3-050393, Reassignment of S-CSCF," 3GPP TSG-SA WG3 Security Meeting #39 (Jun. 28, 2005) http://www.3gpp.org/ftp/tsg_sa/WG3_Security/TSGS3_39_Montreal/Docs/s3-050393.zip.

Huawei, "S3-050395, The reassignment of S-CSCF,"3GPP TSG SA WG3 Security—SA339 (Jun. 28, 2005) http://www.3gpp.orq.ftp/tsg_sa?WG3_Security/TSGS3_39_Montreal/Docs/S3-050395.zip.

Siemens, "S3-050328, Correction of Use of 401 Unauthorized and 399 Warning Headers," 3GPP TSG SA WG3 Security—S3#38 (Apr. 26, 2005) http://www.3gpp.org/ftp/tsg_sa/WG3_Security/TSGS3_38_Geneva/Docs/S3-050238.zip.

* cited by examiner

METHOD, SYSTEM AND DEVICE FOR PROCESSING REGISTRATION EXCEPTION IN USER REGISTRATION PROCEDURE

This application is a continuation of International Patent Application No. PCT/CN2006/001400, filed Jun. 20, 2006, which claims priority to Chinese Patent Application No. 200510076889.2, filed Jun. 20, 2005, all of which are hereby incorporated by reference.

FIELD OF THE INVENTION

The present invention relates to the IP based Multimedia Subsystem (IMS) technology, and more particularly, to a method, a system and a device for processing a registration exception in an IMS network.

BACKGROUND OF THE INVENTION

Along with the development of broadband networks, demands for mobile communications go beyond voice communication. By combining with services such as presence, short message, WEB browsing, positioning information, push-to-talk (PUSH) and file sharing, mobile communication can provide multiple media type services, such as audio, video, picture and text to meet various demands of the user.

For example, the short message service may provide such service as instant messaging, chat room, and multimedia short message; the video service may provide such services as entertainment, multimedia information, and daily communication; an e-business service may provide such service as catalog, search engine, shopping cart, order management and payment; a game service may provide such services as single player game and group game; a positioning service may provide such services as person searching, guiding and alarm; a personal assistant service may provide such services as address book, schedule, book mark management, file storing, event reminder and e-mail.

Under the promotion of various applications, 3rd Generation Partnership Project (3GPP) and 3rd Generation Partnership Project 2 (3GPP2) successively put forward IMS architecture, the objective thereof is to provide a standard open structure in mobile networks to implement various multimedia applications, to provide the user with more selections and richer experience.

Figure 1:
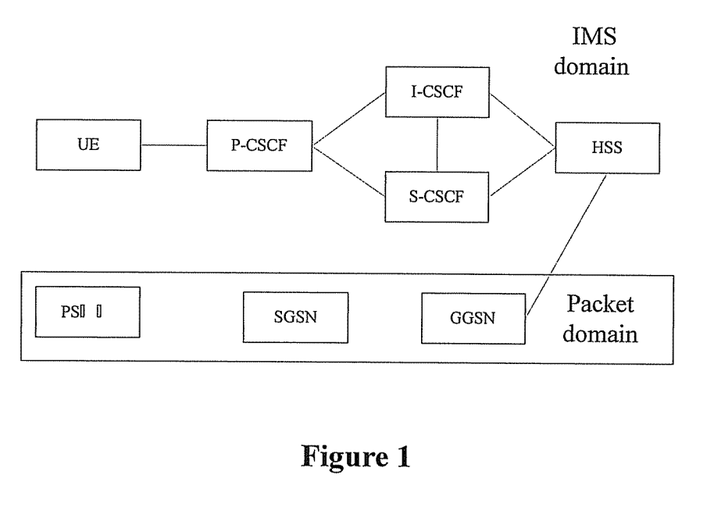
FIG. 1 is a conventional IMS network structure.

As shown in FIG. 1, the IMS is essentially an overlay to the Packet Service Domain (PS-Domain). IMS security architecture includes a Call Session Control Function (CSCF) and a Home Subscriber Server (HSS). The CSCF may include a Serving-CSCF (S-CSCF), a Proxy-CSCF (P-CSCF) and an Interrogating-CSCF (I-CSCF), which may reside in different physical devices or in one physical device. The S-CSCF is a session routing control center of the IMS and is used for performing a session control, maintaining session status, managing user information and generating charging information. The P-CSCF functions as an access point for the user, and is used for performing user registration, controlling Quality of Service (QoS) and conducting security management. The I-CSCF is in charge of the inter-working between the IMS domains, managing S-CSCF assignment, hiding the internal network topology and configuration information and generating charging data. The HSS is a very important user database, and assistants the CSCFs with call processing and session processing.

At the beginning of the IMS (R5 version protocol), the IMS is only used in the 3rd generation mobile communication network. For the richer services of the IMS, the demand of using the IMS in 2G networks are required by the operators. However, it is impossible for the 2G network to support the 3G-based IMS security function. In order to provide the IMS services to users of the 2G network, TR33.878/TR33.978 has defined an Early IMS security mechanism, which provides certain IMS security functions for the IMS services in the 2G network. When the 2G network is upgraded to 3G, full IMS security functions are supported.

The existing IMS security implementation in a 2G network may include followings. A user accesses a 3GPP PS domain network, and the 3GPP PS domain network authorizes the user. When the authorization is successful, a Gateway GPRS Support Node (GGSN) of the PS domain network allocates to the user an IP address which is used when the user uses the IMS services. The GGSN sends the IP address and a Mobile Subscriber ISDN Number (MSISDN) or an International Mobile Subscriber Identity (IMSI) of the user to an HSS via an intermediate entity. The HSS finds an IP Multimedia Private Identity (IMPI) of the user according to the MSISDN or the IMSI, creates a secure binding between the IMPI, MSISDN and the IP address allocated and stores the security binding. When the user wants to use an IMS service, the user sends a registration request (REGISTER) to an S-CSCF through an intermediate entity. The S-CSCF obtains the secure binding from the HSS, stores the secure binding, and checks whether the IP address and the IMS identifier in the registration request from the user match the security binding stored in the HSS. If the IP address and the IMS identifier in the registration request from the user match the security binding stored in the HSS, the S-CSCF determines that the user is a legal user and allows the user to use the IMS service; otherwise, the S-CSCF determines that the user is an illegal user, and rejects the registration request of the user. When the user releases the IP address, it is necessary for the GGSN to send a message to notify the HSS. The HSS may initiate a de-registration procedure at the network side triggered by the message sent from the GGSN.

When the Full 3GPP compliant authorization method is used, the I-CSCF needs to distinguish whether the registration request from the user is an initial registration or a re-registration. Sometimes, when the I-CSCF sends a Session Initiation Protocol (SIP) registration message to the S-CSCF, the S-CSCF may not give a response due to the S-CSCF failure or other reasons, thus the I-CSCF needs to distinguish initial and non-initial REGISTER messages by using certain information included in an Authorization header of the SIP registration message. If the registration message is an initial registration, the I-CSCF may select a new S-CSCF for sending the registration message. If the registration is not an initial registration, the I-CSCF returns a 408 (Request Timeout) response or a 504 (Server Time-out) response to the user, rather than selecting a new S-CSCF.

Due to the fact that the Authorization header is not included in the registration request in early IMS security, and IP Security protocol (IPSec) security associations are not set up between the UE and the P-CSCF, it is impossible to determine whether the registration message is an initial registration or a re-registration according to whether the registration message is a protected register. When the S-CSCF selected by the I-CSCF can not be accessed, the I-CSCF is unable to decide whether the SIP registration message received is an initial registration or a subsequent registration. Network elements which need to distinguish whether the registration is an initial registration or a re-registration are unable to determine subsequent handling procedures. Therefore, we need a solution on the current 3GPP Early IMS protocol.

SUMMARY OF THE INVENTION

Embodiments of the present invention provide a method, a system and a device for processing a registration exception in a user registration procedure to solve the problem that network devices are unable to determine subsequent handling procedures when a registration exception occurs in a registration, where it is impossible to distinguish the initial registration and the re-registration according to whether the registration request is a protected register.

A method for processing a registration exception in a user registration procedure in an IP Multimedia Subsystem (IMS) network; includes:

requesting, by an Interrogating-Call Session Control Function (I-CSCF) in a registration procedure according to a registration request, a Home Subscriber Server (HSS) to allocate a first Service-Call Session Control Function (S-CSCF);

forwarding, by the I-CSCF, the registration request to the first S-CSCF allocated by the HSS according to S-CSCF-associated information carried in a response form the HSS;

returning, by the I-CSCF when a registration exception occurs, a registration failure message to a terminal initiating the registration request or reselecting a second S-CSCF, according to instruction information, indicating whether the registration request is an initial registration or a re-registration, carried in the registration request, or according to the S-CSCF-associated information carried in the response form the HSS.

A system for processing a registration exception in a user registration procedure in an IP Multimedia Subsystem (IMS) network may include:

a Home Subscriber Server (HSS);
a Service-Call Session Control Function (S-CSCF); and
an Interrogating-Call Session Control Function (I-CSCF), configured to comprise:
  a first unit, configured to request the HSS to allocate a first S-CSCF in a registration procedure according to a registration request;
  a second unit, configured to forward the registration request to the first S-CSCF allocated by the HSS according to S-CSCF-associated information carried in a response form the HSS; and
  a third unit, configured to return, when a registration exception occurs, a registration failure massage to a terminal initiating the registration request or reselect a second S-CSCF, according to instruction information, indicating whether the registration request is an initial registration or a re-registration, carried in the registration request, or according to the S-CSCF-associated information carried in the response form the HSS.

An Interrogating-Call Session Control Function (I-CSCF) for processing a registration exception in a user registration procedure in an IP Multimedia Subsystem (IMS) network may include:

a first unit, configured to request an HSS to allocate a first S-CSCF in a registration procedure according to a registration request;
a second unit, configured to forward the registration request to the first S-CSCF allocated by the HSS according to S-CSCF-associated information carried in a response form the HSS; and
a third unit, configured to return, when a registration exception occurs, a registration failure massage to a terminal initiating the registration request or reselect a second S-CSCF, according to instruction information, indicating whether the registration request is an initial registration or a re-registration, carried in the registration request, or according to the S-CSCF-associated information carried in the response form the HSS.

DETAILED DESCRIPTION OF THE INVENTION

In an authorization procedure, when an I-CSCF receives an SIP registration message and detects that the SIP registration message does not include an Authorization header, the I-CSCF uses the early IMS security solution for the IMS user authentication. Alternatively, the I-CSCF may also determines whether the early IMS security solution or the full IMS security solution is used when an S-CSCF selected is in abnormal condition and the subsequent procedures need judge whether the early IMS security solution or the full IMS security solution should be adopted. I-CSCF according to normal handling procedure will send a Cx-UAR massage to request an HSS to allocate an S-CSCF. The HSS returns a response message carrying S-CSCF-associated information based on the current user registration status. I-CSCF selects an S-CSCF according to the response message from the HSS and forwards the SIP registration message to the S-CSCF selected.

The S-CSCF-associated information carried in the response message from the HSS includes the following three alternatives.

A. the S-CSCF-associated information includes an indicated S-CSCF.

B. the S-CSCF-associated information includes a list of capabilities of the S-CSCFs that is needed for the I-CSCF to select an appropriate S-CSCF.

C. the S-CSCF-associated information includes the indicated S-CSCF and the list of capabilities of the S-CSCFs that is needed for the I-CSCF to select the appropriate S-CSCF.

If an exception occurs, e.g. an S-CSCF failure or a network failure, after the I-CSCF forwards the SIP registration message to the indicated S-CSCF, the I-CSCF can not receive a response message from the indicated S-CSCF, or receives a 3XX (forward S-CSCF) response message or a 480 (Temporarily Unavailable) response message from the indicated S-CSCF, that is, the indicated S-CSCF is temporarily unavailable. Since the SIP registration message initiated by the User Equipment (UE) does not include an Authorization header filed and the IPsec security associations are not set up between the UE and the P-CSCF if early IMS authentication method has been adopted, I-CSCF is unable to extend other header fields to determine whether the registration message is a protected register, and is unable to determine whether the registration message is an initial registration or a subsequent registration message according to whether the message is a protected register or a unprotected register. Thus the I-CSCF is unable to determine subsequent handling procedures.

In accordance with an embodiment of the present invention, an exception may be handled as follows.

1. The initial registration message and the subsequent registration message are distinguished by values of some specific fields of the SIP registration message, rather than by determining whether the SIP registration message is a protected register or an unprotected register. For example, the SIP registration message is an initial registration message when the parameter Cseq is set to 1 and the SIP registration message is a subsequent message when the parameter Cseq is not set to 1. A CallID is used to distinguish different initial registration messages at the network side. In addition, a new header field may be defined to explicitly distinguish an initial registration message and a subsequent re-registration message.

A. when determining that the message is an initial registration message according to the specific fields of the SIP registration message, the I-CSCF reselects an S-CSCF to complete the subsequent registration procedure. If the I-CSCF has no S-CSCF capabilities data, the I-CSCF needs to request the HSS for the capabilities data.

B. when determining that the message is a re-registration message according to the specific fields of the SIP registration message, the I-CSCF has two selections:

a. the I-CSCF returns to the user a 408 (Request Timeout) response or a 504 (Server Time-out) response rather than reselecting an S-CSCF. On receipt the response from the I-CSCF, the UE may determine how to handle the subsequent procedure by itself. For example, the UE may initiate a new registration request a time period later, or may use other methods.

b. the I-CSCF reselects an S-CSCF. At this point, the I-CSCF queries the HSS of the S-CSCF capabilities information for providing services to the user. The HSS returns S-CSCF capabilities data to the I-CSCF for the user registration. The I-CSCF selects a new S-CSCF according to the capabilities data from the HSS. The newly selected S-CSCF is not any one of S-CSCFs selected previously during this same registration procedure.

Since the above S-CSCF reselection procedure is not notified to the UE, the UE needs to perform an adaptability update according to a re-registration response message received from the I-CSCF.

When the UE receives a re-registration successful message and finds that the S-CSCF in the re-registration procedure is not the original S-CSCF recorded before this re-registration procedure, the UE removes all the information associated with the original S-CSCF. For example, the UE removes the subscription initiated from the user to the original S-CSCF and the call/session initiated to or from the original S-CSCF. At the same time, the UE updates original registration information according to the re-registration successful message.

When the UE receives a re-registration failure message and finds that the S-CSCF in the re-registration procedure is not the original S-CSCF recorded before this re-registration procedure, the UE may perform no operation or remove all the information associated with the original S-CSCF, for example, the subscription initiated from the user to the original S-CSCF and the call/session initiated to or from the original S-CSCF. At this point, the UE may also re-initiate a new registration.

2. The I-CSCF determines whether the user has registered according to the S-CSCF-associated information carried in the response message returned by the HSS, and performs relevant subsequent handling procedures. The I-CSCF respectively performs the following handling procedures according to the three conditions of the S-CSCF-associated information.

(1). The HSS returns an indicated S-CSCF. When the IMPU or other relevant IMPU of the user has registered to the indicated S-CSCF and the HSS needs to guarantee that all the relevant IMPUs of the user are registered to the same S-CSCF; or the relevant IMPU of the user may be in an unregistered status (different form a Not Registered status) and may be maintained on the indicated S-CSCF, and the HSS considers that it is not necessary to reallocate an S-CSCF at this point; or, this IMPU has been registered, it is indicated that a re-registration message is received at this point.

In this case, the I-CSCF may perform handling procedure by means of the following options.

Option A, the I-CSCF returns to the UE registration failure message, such as a 408 (Request Timeout) message or a 504 (Server Time-out) message, and does not select an S-CSCF at this point. After receiving the registration failure message, the UE may determine how to handle the subsequent procedure by itself. For example, the UE may re-initiate a registration request a time period later, or may use other methods.

Option B, the I-CSCF re-selects an S-CSCF. At this point, the I-CSCF queries the HSS of the S-CSCF capabilities information for providing services to the user. The HSS returns S-CSCF capabilities data to the I-CSCF for the user registration. The I-CSCF selects a new S-CSCF according to the capabilities data from the HSS. The newly selected S-CSCF is not any one of S-CSCFs selected previously during this same registration procedure.

Since the above S-CSCF reselection procedure is not notified to the UE, the UE needs to perform an adaptability update according to a re-registration response message received from the I-CSCF.

When the UE receives a re-registration successful message and finds that the S-CSCF in the re-registration procedure is not the original S-CSCF recorded before this re-registration procedure, the UE removes all the information associated with the original S-CSCF. For example, the UE removes the subscription initiated from the user to the original S-CSCF and the call/session initiated to the original S-CSCF. At the same time, the UE updates original registration information according to the re-registration successful message.

When the UE receives a re-registration failure message and finds that the S-CSCF in the re-registration procedure is not the original S-CSCF recorded before this re-registration procedure, the UE may perform no operation or remove all the information associated with the original S-CSCF, for example, the subscription initiated from the user to the original S-CSCF and the call/session initiated to or from the original S-CSCF. At this point, the UE may also re-initiate a new registration.

In practical operations, option A or B may be selected by the network operator.

(2). The HSS returns a list of capabilities of the S-CSCF required. In such a case, the registration is always an initial registration of the user, and no relevant IMPU of the user has registered to the IMS domain.

In this case, the I-CSCF may reselect a new S-CSCF according to the S-CSCF capabilities data queried previously and returned last time. If the reselected S-CSCF is still unable to register, the I-CSCF may continue to select another S-CSCF (different from the previously selected S-CSCFs) according to the required S-CSCF capabilities for the user registration. If the I-CSCF can not select an appropriate S-CSCF which fulfills the capabilities indicated by the HSS, the I-CSCF sends back a 600 (Busy Everywhere) response to the user.

(3). The HSS returns to the I-CSCF an specialized S-CSCF and the list of capabilities of the S-CSCFs that is needed for the I-CSCF to select an appropriate S-CSCF. This condition always represents that the relevant IMPU of the user is in the unregistered status or the operator sets a preferred S-CSCF on the HSS. At this point, the HSS recommends to the user an S-CSCF and returns the S-CSCF capabilities required by the user. The S-CSCF capabilities provided by the HSS are used by the I-CSCF to determine whether to use the S-CSCF recommended by the HSS or to reselect an S-CSCF. In this case, the I-CSCF may reselect a new S-CSCF according to the S-CSCF capabilities returned by the HSS. The handling mode is similar to Condition (2), and is not further described.

If the newly reselected S-CSCF is still unable to register, the I-CSCF may continue to select another S-CSCF (different from the previously selected S-CSCFs) according to the required S-CSCF capabilities for the user registration. If the I-CSCF can not select an appropriate S-CSCF which fulfills the capabilities indicated by the HSS, the I-CSCF sends back a 600 (Busy Everywhere) response to the user.

In the subsequent registration procedure after an S-CSCF is selected, the I-CSCF may discard the information returned by other S-CSCFs apart from the currently-selected S-CSCF. That is, the I-CSCF does not forward the information from other S-CSCFs apart from the currently-selected S-CSCF.

Figure 2:
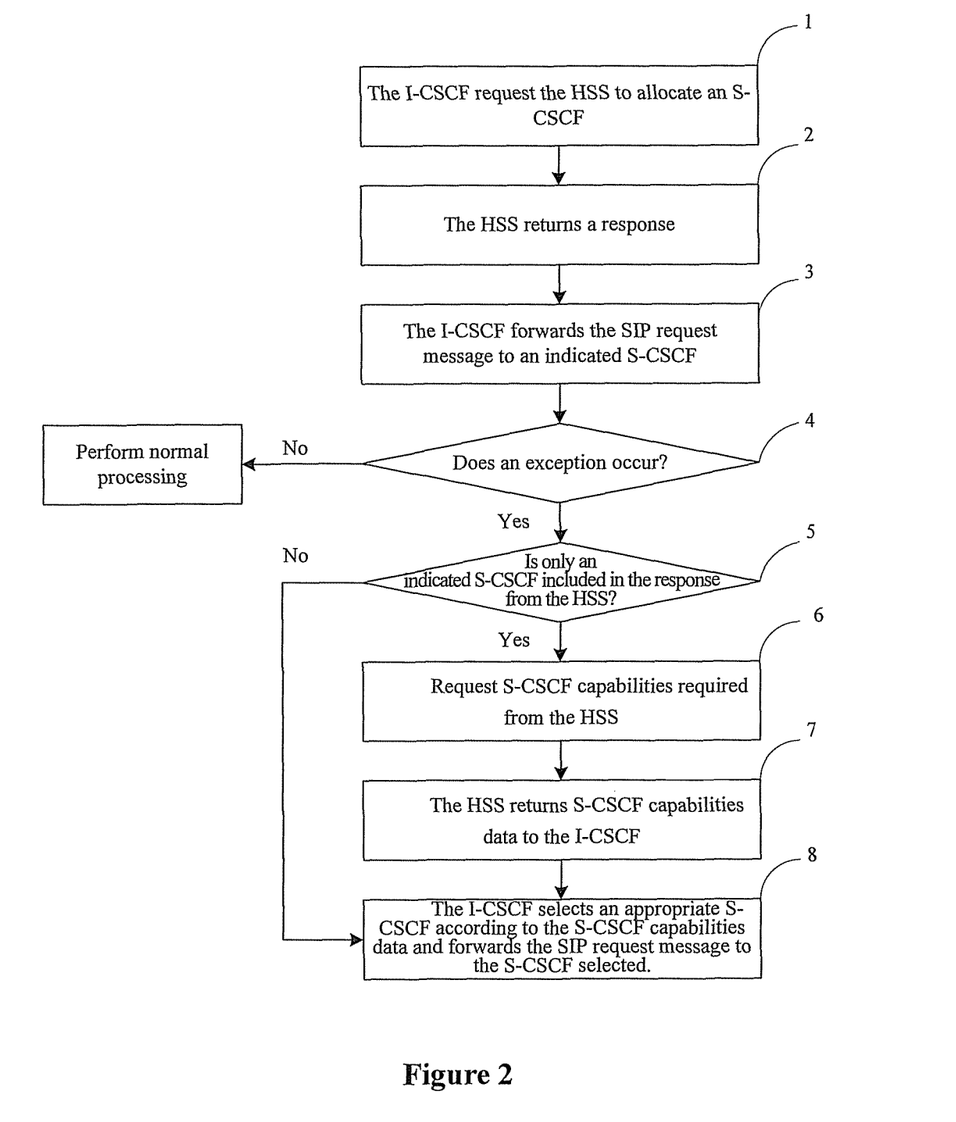
FIG. 2 is a flowchart illustrating handling procedures in accordance with an embodiment of the present invention when a registration exception occurs.

As an example shown in FIG. 2, when a registration exception occurs, the main procedures for determining the subsequent handling procedure according to the S-CSCF-associated information carried in the response from the HSS are as follows:

Block 1: after receiving an SIP registration request form a user, an I-CSCF sends a Cx-UAR massage to request the HSS to allocate an S-CSCF.

Block 2: the HSS returns a response message to the I-CSCF according to subscription data of the user.

Block 3: the I-CSCF determines an S-CSCF according to the response message from the HSS and forwards the SIP registration message to the S-CSCF determined.

Block 4: the I-CSCF determines whether an exception occurs (for example no response from the S-CSCF is received or a 480 message is received); if the exception occurs, proceed to Block 5; otherwise, perform normal subsequent procedures.

Block 5: the I-CSCF determines whether S-CSCF-associated information carried in the response message from the HSS only includes a specialized S-CSCF. If the S-CSCF-associated information only includes a specialized S-CSCF, proceeds to Block 6; otherwise, it is indicated that the response message includes required S-CSCF capabilities data or includes a specialized S-CSCF and the required S-CSCF capabilities, and proceed to Block 8.

Block 6: the I-CSCF queries HSS for the required S-CSCF capabilities.

Block 7: the HSS returns S-CSCF capabilities data needed for the user registration to the I-CSCF according to the subscription data of user.

Block 8: the I-CSCF selects a new S-CSCF according to the S-CSCF capabilities data, and forwards the SIP registration message to the newly selected S-CSCF.

Figure 3:
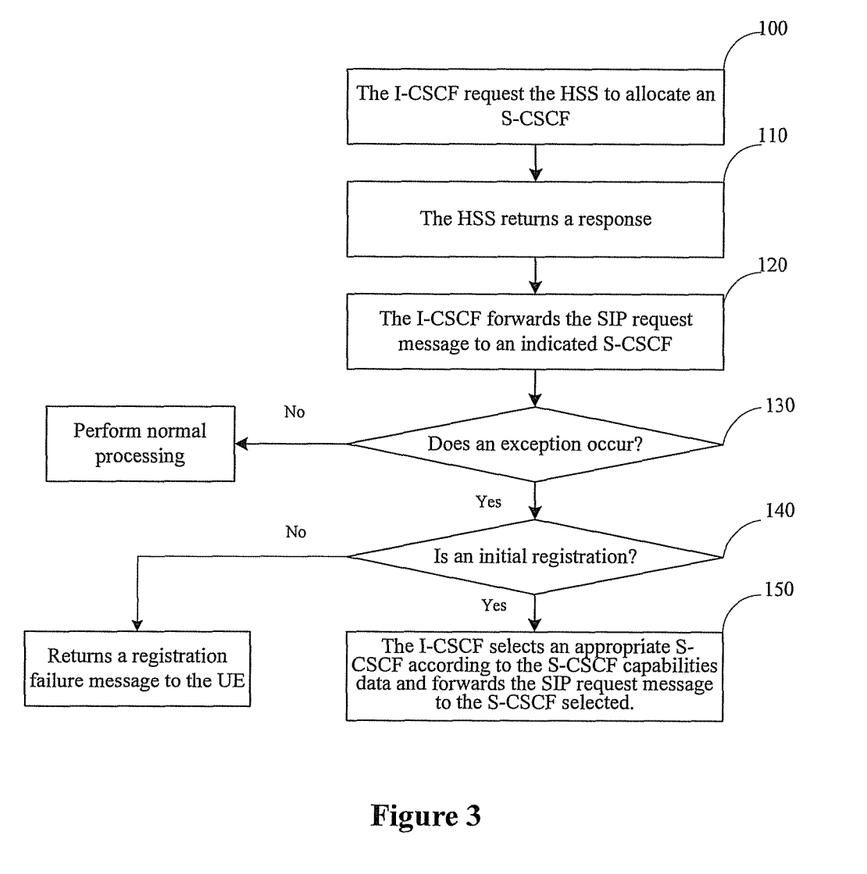
FIG. 3 is a flowchart illustrating handling procedures in accordance with another embodiment of the present invention when a registration exception occurs.

As another example shown in FIG. 3, when a registration exception occurs, the main processes for determining the subsequent handling procedure according to the information indicating whether the registration is an initial registration or a re-registration are as follows:

Block 100: after receiving an SIP registration request form a user, an I-CSCF sends a Cx-UAR massage to request the HSS to allocate an S-CSCF, wherein the SIP request message includes a specific field that carries instruction information indicating whether the registration is an initial registration or a re-registration.

Block 110: the HSS returns a response message to the I-CSCF according to subscription data of the user.

Block 120: the I-CSCF determines an S-CSCF according to the response message from the HSS and forwards the SIP registration message to the S-CSCF determined.

Block 130: the I-CSCF determines whether an exception occurs (for example no response from the S-CSCF is received or a 480 message is received); if the exception occurs, proceed to Block 140; otherwise, perform normal subsequent procedures.

Block 140: the I-CSCF determines whether the registration is an initial registration according to the instruction information in the specific filed of the SIP registration message. If the registration is an initial registration, proceed to Block 150; otherwise, return to the user a failure message or select another S-CSCF.

Block 150: the I-CSCF selects a new S-CSCF according to the S-CSCF capabilities data, and forwards the SIP registration message to the newly selected S-CSCF.

As above, according to the solution provided by embodiments of the present invention, in a registration procedure without the Authorization header included in the SIP registration massage, after the I-CSCF sends the SIP registration message to the S-CSCF and an exception subsequently occurs, the I-CSCF may correctly determine the subsequent handling procedures according to the information element conveyed in the SIP registration message and the response message returned by the HSS, which makes it possible to overcome the problem that the I-CSCF is unable to correctly select the subsequent handling procedures in that there is no Authorization header in the Early IMS registration procedure or other registrations in the prior art.

The solution provided by embodiments of the present invention may be applicable for other registration methods in which the I-CSCF is unable to determine whether the registration message is a protected register due to lack of the Authorization header or lack of the relevant identifier, when the registration is abnormal.

Though the present invention has been illustrated and described by some preferred embodiments, those skilled in the art should understand that various changes may be made in form and detail without departing from the scope of the present invention and therefore should be covered in the protection scope of the present invention assigned by the appended claims and its equivalents.

The invention claimed is:

1. A method for processing a registration exception in a user registration procedure in an IP Multimedia Subsystem (IMS) network; comprising:
    requesting a Home Subscriber Server (HSS) to allocate a first Service-Call Session Control Function (S-CSCF) in a registration procedure according to a registration request that does not carry information about whether the registration request is a protected registration request;
    forwarding the registration request to the first S-CSCF according to S-CSCF-associated information carried in a response from the HSS;
    determining whether the registration request is an initial registration or a re-registration according to information carried in the registration request; and
    returning, when a registration exception occurs, a registration failure massage message to a terminal initiating the registration request or selecting a second S-CSCF, according to:

information indicating whether the registration request is an initial registration or a re-registration carried in the registration request.

2. The method of claim 1, wherein returning the registration failure message to a terminal initiating the registration request or selecting the second S-CSCF comprises one of:

selecting the second S-CSCF according to S-CSCF capabilities data received from the HSS and forwarding the registration request to the second S-CSCF, when the registration request is an initial registration according to the information carried in the registration request;

returning the registration failure message to the terminal initiating the registration request, when the registration request is a re-registration according to the information carried in the registration request; and selecting the second S-CSCF accordinb to S-CSCF capabilities data received from the HSS and forwarding the registration request to the second S-CSCF, when the registration request is a re-registration according to the information carried in the registration request.

3. The method of claim 1, wherein the selecting the second S-CSCF comprises:

requesting the HSS for S-CSCF capabilities data, selecting the second S-CSCF according to the S-CSCF capabilities data, and forwarding the registration request to the second S-CSCF.

4. The method of claim 3, further comprising:

returning the registration failure message to the terminal initiating the registration request if an appropriate S-CSCF is not able to be selected according to the S-CSCF capabilities data.

5. The method of claim 1, further comprising:

discarding information returned by S-CSCFs apart from the second S-CSCF.

6. The method of claim 1, further comprising:

replacing, by the terminal initiating the registration request, registration information of the first S-CSCF by registration information of the second S-CSCF, when receiving a re-registration successful message and finding that the second S-CSCF selected is different from the first S-CSCF previously recorded;

performing no processing by the terminal initiating the registration request when receiving a re-registration failure message and finding that the second S-CSCF selected by the I-CSCF is different from the first S-CSCF recorded; or removing all information associated with the first S-CSCF recorded, when receiving a re-registration failure message and finding that the second S-CSCF selected by the I-CSCF is different from the first S-CSCF recorded.

7. The method of claim 1, wherein the S-CSCF-associated information includes at least one of: an indicated S-CSCF and S-CSCF capabilities data which is a list of capabilities of the S-CSCFs that is needed for the I-CSCF to select a S-CSCF.

8. A method for processing a registration exception in a user registration procedure in an IP Multimedia Subsystem (IMS) network; comprising:

requesting a Home Subscriber Server (HSS) to allocate a first Service-Call Session Control Function (S-CSCF) in a registration procedure according to a registration request;

forwarding the registration request to the first S-CSCF according to S-CSCF-associated information carried in a response from the HSS;

determining whether the registration request is an initial registration or a re-registration according to information carried in the registration request; and returning, when a registration exception occurs, a registration failure message to a terminal initiating the registration request or selecting a second S-CSCF, according to information indicating whether the registration request is an initial registration or a re-registration carried in the registration request.

9. The method of claim 8, wherein returning the registration failure message to a terminal initiating the registration request or selecting the second S-CSCF comprises one of:

selecting the second S-CSCF according to S-CSCF capabilities data received from the HSS and forwarding the registration request to the second S-CSCF, when the registration request is an initial registration according to the information carried in the registration request;

returning the registration failure message to the terminal initiating the registration request, when the registration request is a re-registration according to the information carried in the registration request; and selecting the second S-CSCF according to S-CSCF capabilities data received from the HSS and forwarding the registration request to the second S-CSCF, when the registration request is a re-registration according to the information carried in the registration request.

* * * * *

UNITED STATES PATENT AND TRADEMARK OFFICE
CERTIFICATE OF CORRECTION

PATENT NO. : 8,693,312 B2  Page 1 of 1
APPLICATION NO. : 11/780791
DATED : April 8, 2014
INVENTOR(S) : Zhu et al.

It is certified that error appears in the above-identified patent and that said Letters Patent is hereby corrected as shown below:

In the Claims:

*Column 8, Claim 1, Line 65, "failure massage message" should read -- failure message --.*

Signed and Sealed this
Twenty-sixth Day of August, 2014

Michelle K. Lee
*Deputy Director of the United States Patent and Trademark Office*